No. 706,729. Patented Aug. 12, 1902.
H. F. DETERDING.
PULVERIZING SHOE.
(Application filed Apr. 23, 1902.)
(No Model.) 2 Sheets—Sheet 1.
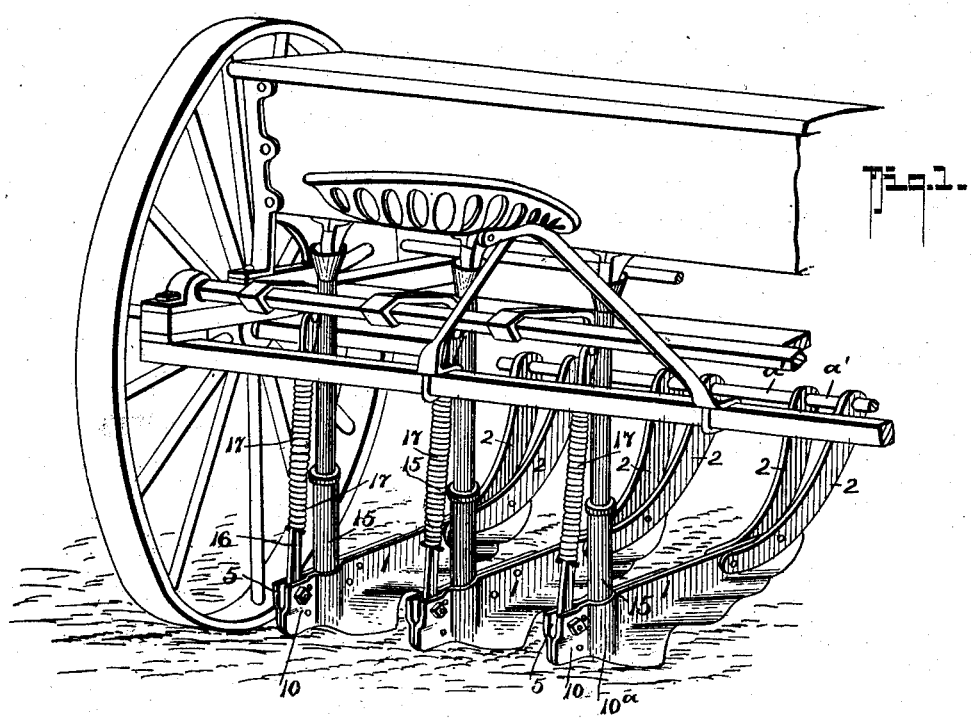
WITNESSES:
Guy V. Worthington
E. E. Overholt
INVENTOR
H. F. Deterding
BY
Fred G. Dieterich & Co.
ATTORNEYS

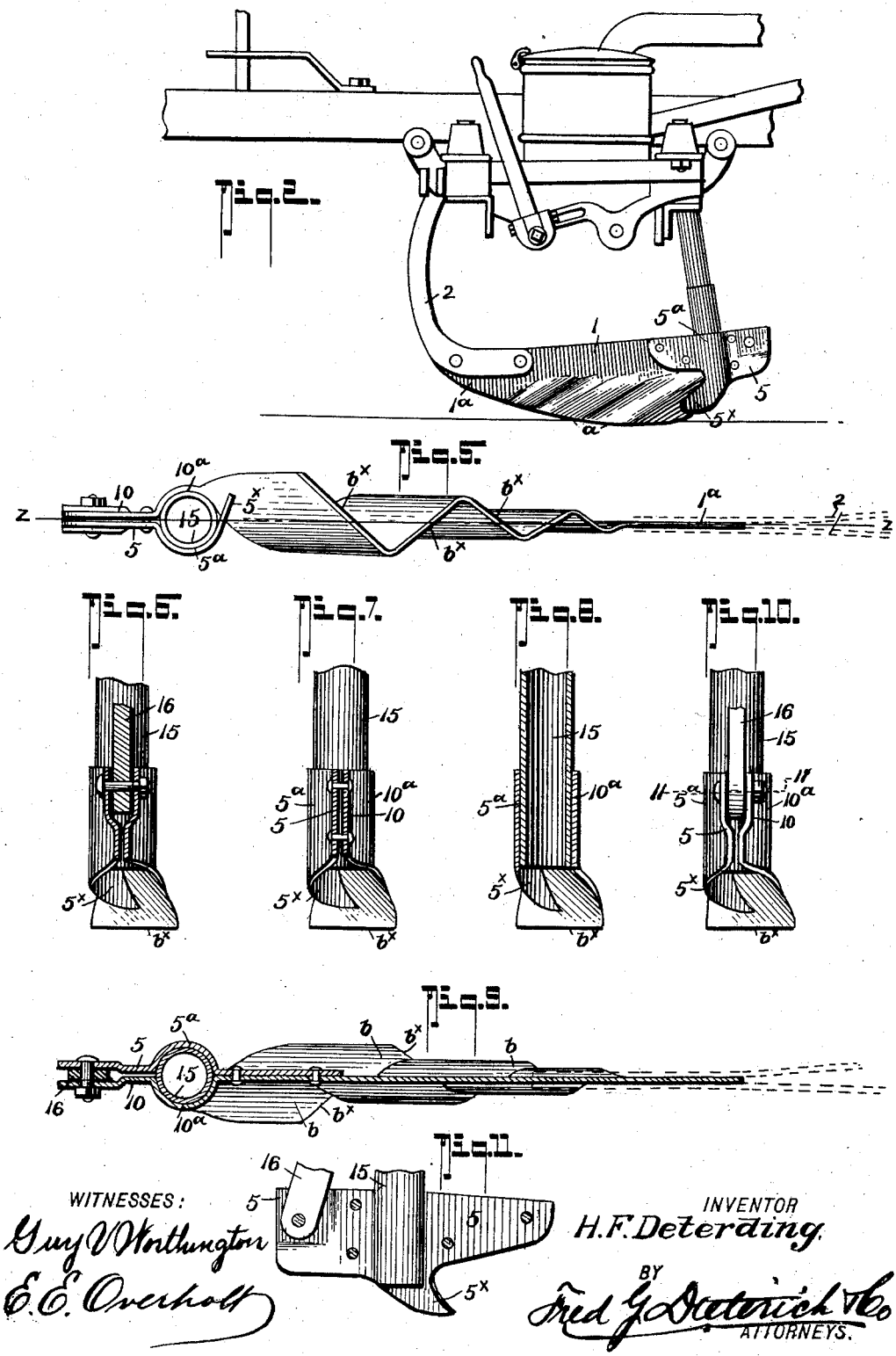

UNITED STATES PATENT OFFICE.

HENRY F. DETERDING, OF COMMERCE, MISSOURI.

PULVERIZING-SHOE.

SPECIFICATION forming part of Letters Patent No. 706,729, dated August 12, 1902.

Application filed April 23, 1902. Serial No. 104,309. (No model.)

*To all whom it may concern:*

Be it known that I, HENRY F. DETERDING, residing at Commerce, in the county of Scott and State of Missouri, have invented a new and Improved Pulverizing-Shoe, of which the following is a specification.

My invention, which relates to seed-sowing machines, seeks to provide a new type of cutter or furrow-opener for grain drills and planters, of a simple and economical construction, capable of being applied for use on any of the ordinary forms of seed-planting machines and which effectively serves for its intended purposes.

Heretofore in the ordinary types of seed sowing or planting machines various devices have been provided for cutting the furrow for receiving the seed, but, so far as I know, nearly all of them are open to some objection and as not meeting with all of the qualities desired. In some of the types of furrow-openers or cutter mechanisms now in general use they operate to cut the furrow and cover the seed fairly well, provided the soil is not foul with trash, naturally hard, or hardened by heavy rains; but in soil of the character referred to and most frequently when said soil is prepared for receiving grain they gather up the trash in front thereof and prevent the soil from properly ridging between the seed-rows, fail to properly cover the deposited seed, and in case of very hard soil they fail to penetrate it enough to provide for making a furrow sufficiently deep and with the broken earth sufficiently loosened to cover the seed, which is then frequently destroyed by exposure to birds or insects.

To overcome the objectionable features in the ordinary form of sowing-machines as above set out, I have provided a peculiar construction of combined corrugated and sinuous edged furrow-opener or pulverizing-shoe especially designed so as not to gather rubbish or trash in foul soil and drag it along and adapted to freely penetrate the soil however hard it may be, whether naturally so or packed by heavy rains.

My invention in its generic nature comprehends a shoe or runner having a sinuous or worm-like cutting or penetrating edge and corrugated surfaces that merge with the worm-like cutting edges and which deflect rearwardly and upwardly at an angle to the vertical plane of the shoe.

My improvement in its more complete make-up embodies a shoe or opener having a cutting surface sinuous or worm-like in a horizontal plane and corrugated or wing-like portions that merge with the worm-like cutting edge, extend rearwardly and upwardly at an angle to the vertical plane of the shoe, and of gradually-increasing area in transverse direction from the front toward the rear end of the shoe and having the said horizontal cutting surface and the corrugated portions correlatively so arranged that the shoe has a shearing action and the cutting edges automatically maintained in a sharp condition as said edge is worn.

In its more subordinate features my invention consists in certain novel details of construction and peculiar combination of parts, all of which will hereinafter be fully explained, and specifically pointed out in the appended claims, reference being had to the accompanying drawings, in which—

Figure 1 is a perspective view of a portion of a seed-drill with my improved shoe or furrow-opener attached. Fig. 2 is a side view of a portion of a check-row corn-planter equipped with my improved shoe. Fig. 3 is a perspective view of a shoe or opener constructed in accordance with my invention. Fig. 4 is a diagrammatic side elevation of the same. Fig. 5 is a diagrammatic inverted plan view thereof. Figs. 6, 7, and 8 are cross-sections taken on the lines 6 6, 7 7, and 8 8, respectively, of Fig. 4. Fig. 9 is a transverse section taken on the line 9 9 of Fig. 3. Fig. 10 is a rear elevation thereof. Fig. 11 is a detail longitudinal section on the line 11 11 of Fig. 9.

In the practical construction my invention embodies a runner the construction of which is such as to cause it in operation to act as a combined cutter and pulverizing-shoe. This shoe (designated generally by 1) is formed of a body of stout spring metal having in its general outline the shape of the ordinary runner or shoe. The body portion 1 in my form of shoe is stamped, pressed, or otherwise formed, and its front end is suitably flattened, as at 1ª, to receive the opposing parallel connecting straps or arms 2, which are secured to the end 1ª of the shoe 1 and have their front ends 2ª spread for conveniently connecting with supporting members a' a' of the machine, to which they are attached in the usual manner of connecting runners or furrow-openers.

The body 1 is formed with a series of rearwardly-inclined corrugations a of a gradually-increasing depth from the front or point end x to the heel y, and these corrugations or inclined depressions are of a depth to extend alternately beyond the longitudinal or central line (see z, Fig. 5) of the shoe, whereby the lower edge of the runner assumes a sinuous or worm-like shape, the convolutions of which gradually increase from the point toward the heel end. By inclining the depressions or corrugations a at the angle shown (which to obtain the best results is approximately that of sixty-five degrees) the lower edge of the shoe or runner will have its cutting-surface (indicated by b) at an acute angle to the inclining depressions a, and by reason of the edge b zigzagging across the longitudinal plane of the shoe or runner a series of forwardly-inclined (in alternate opposite directions) shearing edges $b^\times$ are provided, which in operation tend to penetrate and cut into the hard soil and turn it and also cut any trash or weeds that might be encountered in dragging over the soil to be planted.

By providing the shoe with a series of corrugations inclined as shown and described and of gradually-increasing depth from the point to the heel of the shoe or runner a number of turning surfaces or wings are provided of progressively-increasing width, which gradually reduce the soil turned up by the point, pulverizes the same, and leaves it in good condition to roll over the seed dropped into the furrow. Furthermore, by reason of the correlation of the inclined corrugations and the bottom or penetrating edge of the shoe the worm-like shearing edges will automatically remain sharpened until the shoe-blade is worn down to the base of the corrugated part thereof.

The penetrating edge of the shoe inclines downward from the point to the heel, and as the worm-like edged cutters shear the soil right and left each succeeding cutting edge cuts a slice deeper and wider than the preceding one and lifts the fresh-cut soil up and out of the way for the next cutting edge and corrugated surface to engage, and thus pulverizes the furrows up to the width desired and leaves the soil in a condition to roll back in the furrow after the shoes pass on, and thereby provides for covering the seed in a most convenient and economical way. Again, by reason of the progressively-increasing width of the cutting edges grass and rubbish are so thoroughly cut and engaged by the first cuts or sweeps given by the front cutters and corrugations left and right that the same are reduced, while the rear or other cutting edges and corrugations bury deep beneath the surface of the soil and root up the weeds in a most effective manner, and as the penetrating cutting edge follows in a horizontal plane or line somewhat after the manner of the usual runner the same will readily pass over stones and other impenetrable substances frequently found in land prepared for seeding.

The rear end of the shoe terminates in a flattened extension 10, formed with a vertical concavity 10ª, adapted to form a seat for one side of the dropping-tube 15, which is firmly held against the shoe by a cap-plate 5, also formed with a vertical concavity 5ª to engage the tube. The plate 5 is riveted to the shoe-body 1 and the extension 10 and has a pendent portion $5^\times$, that interlocks with the rear end of the corrugated or wing portion of the shoe 1, and the lower end of the said portion $5^\times$ is in a plane with the lower end of the tube 15, which end, as is clearly shown, is above the lower or cutting edge of the shoe.

16 designates the guide or link arm, that joins the rear end of the shoe with its supporting-frame, and 17 the usual pressure-spring disposed thereon for keeping the heel of the shoe pressed downward.

Having thus described my invention, what I claim, and desire to secure by Letters Patent, is—

1. A furrow opening and pulverizing shoe for seed-planters, having a worm-like penetrating edge, for the purposes described.

2. A furrow opening and pulverizing shoe, having a cutting-surface, worm-like in a horizontal plane, and laterally-projected wings merging with said cutting-surface.

3. A furrow opening and pulverizing shoe, the body of which is corrugated from the penetrating edge upwardly and rearwardly at an angle to the vertical plane of the shoe.

4. A furrow opening and pulverizing shoe, comprising a corrugated body portion, the corrugations of which extend upwardly and rearwardly from the penetrating edge, and are of a gradually-increasing area in transverse direction from the front to the heel portion.

5. A furrow opening and pulverizing shoe, consisting of a body, having a series of parallel corrugations, inclined rearwardly at an acute angle to the lower or penetrating edge of the body, and merging therewith, for the purposes specified.

6. In a furrow opening and pulverizing shoe of the character described, the combination with the dropping-tube and a spring-metal shoe-body, having a rearwardly-extended portion, a spring-metal cap-plate for opposing said extension, said extension and cap-plate having seat portions adapted to engage and clamp the dropping-tube, substantially as shown and for the purposes described.

7. As a new article, a spring-metal furrow opening and pulverizing shoe, having attached means for joining it with the supporting-frame of the machine to which it is to be attached, said shoe having a sinuous penetrating edge, and covering-wings extended laterally alternately to each side of the longitudinal plane of the shoe-body, said wings terminating at their lower end with the penetrating edge of the shoe and inclined rearwardly, and being of progressively-increasing widths from the front to the heel end of the shoe, for the purposes described.

HENRY F. DETERDING.

Witnesses:
  HUGH T. BLACKLEDGE,
  C. F. DE WINT.